(12) United States Patent
Kim et al.

(10) Patent No.: US 10,939,458 B2
(45) Date of Patent: *Mar. 2, 2021

(54) METHOD AND APPARATUS FOR TRANSMITTING AND RECEIVING DATA CHANNEL AND CONTROL CHANNEL IN WIRELESS COMMUNICATION SYSTEM

(71) Applicant: Samsung Electronics Co., Ltd., Gyeonggi-do (KR)

(72) Inventors: Taehyoung Kim, Gyeonggi-do (KR); Youngbum Kim, Gyeonggi-do (KR); Jeongho Yeo, Gyeonggi-do (KR); Jinyoung Oh, Gyeonggi-do (KR); Seunghoon Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/921,504

(22) Filed: Jul. 6, 2020

(65) Prior Publication Data

US 2020/0337064 A1 Oct. 22, 2020

Related U.S. Application Data

(63) Continuation of application No. 16/247,030, filed on Jan. 14, 2019, now Pat. No. 10,708,931.

(30) Foreign Application Priority Data

Jan. 12, 2018 (KR) .................. 10-2018-0004341

(51) Int. Cl.
*H04W 72/12* (2009.01)
*H04L 5/00* (2006.01)

(52) U.S. Cl.
CPC .......... *H04W 72/1205* (2013.01); *H04L 5/00* (2013.01); *H04W 72/1289* (2013.01)

(58) Field of Classification Search
CPC .. H04W 72/1205; H04W 72/1289; H04L 5/00
(Continued)

(56) References Cited

U.S. PATENT DOCUMENTS 10,708,931 B2 * 7/2020 Kim ..................... H04L 5/0046
2017/0195093 A1 7/2017 Kim et al.
(Continued)

FOREIGN PATENT DOCUMENTS

WO WO 2016/069144 5/2016
WO WO 2017/171351 10/2017

OTHER PUBLICATIONS

CATT, "Details of Rate Matching for PDSCH and PUSCH", R1-1720210, 3GPP TSG RAN WG1 Meeting 91, Nov. 27-Dec. 1, 2017, 6 pages.
(Continued)

*Primary Examiner* — Peter G Solinsky
(74) *Attorney, Agent, or Firm* — The Farrell Law Firm, P.C.

(57) ABSTRACT

A method performed by a terminal in a wireless communication system includes receiving, from a base station, information on a rate matching configuration and an aggregation factor associated with a number of a plurality of slots; receiving, from the base station, downlink control information including scheduling information for data and a rate matching indicator; identifying resources based on the scheduling information, except for at least one rate matching resource associated with the rate matching indicator; and receiving, from the base station, the data on the identified resource, wherein the data is repeated in the plurality of slots associated with the aggregation factor, and wherein the rate matching indicator is applied to a slot where the rate matching configuration is present among the plurality of slots.

20 Claims, 14 Drawing Sheets

(58) Field of Classification Search
USPC .......................................................... 370/329
See application file for complete search history.

(56) References Cited

U.S. PATENT DOCUMENTS

| | | |
|---|---|---|
| 2017/0367046 A1 | 12/2017 | Papasakellariou |
| 2019/0116009 A1 | 4/2019 | Yum |
| 2019/0116592 A1 | 4/2019 | Moon et al. |
| 2019/0200332 A1 | 6/2019 | Hwang |
| 2020/0092062 A1 | 3/2020 | Yum |

OTHER PUBLICATIONS

AT&T, "Remaining Details on Rate Matching Aspects for NR DL and UL", R1-1719652, 3GPP TSG RAN WG1 Meeting 91, Nov. 27-Dec. 1, 2017, 3 pages.
Samsung, "On Rate Matching", R1-1717677, 3GPP TSG RAN WG1 Meeting 90bis, Oct. 9-13, 2017, 9 pages.
European Search Report dated Aug. 7, 2020 issued in counterpart application No. 19738593.3-1215, 10 pages.
ZTE, Sanechips, "About Dynamic Resource Sharing", R1-1719495, 3GPP TSG RAN1 Meeting 91, Nov. 27-Dec. 1, 2017, 4 pages.
LG Electronics, "Discussion,on Resource Allocation and TBS Determination", R1-1719929, 3GPP TSG RAN WG1 Meeting 91, Nov. 27-Dec. 1, 2017, 16 pages.
Nokia, Nokia Shanghai Bell, "On Rate-Matching in NR", R1-1720513, 3GPP TSG-RAN WG1 NR#91, Nov. 27-Dec. 1, 2017, 8 pages.
International Search Report dated Apr. 12, 2019 issued in counterpart application No. PCT/KR2019/000379, 3 pages.

* cited by examiner

METHOD AND APPARATUS FOR TRANSMITTING AND RECEIVING DATA CHANNEL AND CONTROL CHANNEL IN WIRELESS COMMUNICATION SYSTEM

CROSS-REFERENCE TO RELATED APPLICATION(S)

This application is a Continuation Application of U.S. patent application Ser. No. 16/247,030, which was filed on Jan. 14, 2019 in the U.S. Patent and Trademark Office, and is based on and claims priority under 35 U.S.C. § 119 to Korean Patent Application No. 10-2018-0004341, which was filed on Jan. 12, 2018 in the Korean Intellectual Property Office, the disclosure of which is incorporated by reference herein in its entirety.

BACKGROUND

1. Field

The disclosure relates generally to a wireless communication system, and more particularly, to a method and apparatus for transmitting and receiving a data channel and a control channel.

2. Description of Related Art

To meet the increased demand for wireless data traffic since the deployment of $4^{th}$ generation (4G) communication systems, efforts have been made to develop an improved $5^{th}$ generation (5G) or pre-5G communication system. Therefore, the 5G or pre-5G communication system is also called a "beyond 4G network" or a "post long term evolution (LTE) system". The 5G communication system is considered to be implemented in higher frequency (mmWave) bands, e.g., 60 gigahertz (GHz) bands, so as to accomplish higher data rates.

To decrease propagation loss of radio waves and increase a transmission distance, beamforming, massive multiple-input multiple-output (MIMO), full dimensional MIMO (FD-MIMO), array antenna, analog beamforming, and large scale antenna techniques are considered for use in 5G communication systems. In addition, in 5G communication systems, system network improvement is under way based on advanced small cells, cloud radio access networks (RANs), ultra-dense networks, device-to-device (D2D) communication, wireless backhaul, moving network, cooperative communication, coordinated multi-points (CoMP), and reception-end interference cancellation. In the 5G system, hybrid frequency shift keying (FSK) and frequency quadrature amplitude modulation (FQAM), sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

The Internet is now evolving to the Internet of things (IoT), where distributed entities, such as things, exchange and process information without human intervention. The Internet of everything (IoE), which is a combination of the IoT technology and big data processing technology through connection with a cloud server, has also emerged. As technology elements, such as "sensing technology", "wired communication and network infrastructure", "wireless communication and network infrastructure", "service interface technology", and "security technology" are in demand for IoT implementation, a sensor network, a machine-to-machine (M2M) communication, and a machine type communication (MTC) have been recently researched. Such an IoT environment may provide intelligent internet technology services that create a new value to human life by collecting and analyzing data generated among connected things. IoT may be applied to a variety of fields including smart home, smart building, smart city, smart or connected cars, smart grid, health care, smart appliances and advanced medical services through convergence and combination between existing information technology (IT) and various industrial applications.

Various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be an example of convergence between the 5G technology and the IoT technology.

In a 5G communication system, a base station may configure time and frequency resources as rate matching resources (RMRs) for various purposes with respect to a terminal. The base station may rate-match the configured rate matching resource part, and may transmit and receive data channels.

SUMMARY

The present disclosure has been made to address the above-mentioned problems and disadvantages, and to provide at least the advantages described below.

In accordance with an aspect of the present disclosure, a method for transmitting data in a wireless communication system is provided. The method includes transmitting configuration information on rate matching including information on a rate matching resource group to a terminal; transmitting aggregation information indicating a number of a plurality of slots for multi-slot scheduling to the terminal; transmitting scheduling information including a rate matching indicator indicating whether rate matching based on the rate matching resource group is performed; identifying a resource for transmitting data based on the aggregation information and the rate matching indicator; and transmitting data on the resource in the plurality of slots, wherein the resource in the plurality of slots is identified by excluding resources indicated by the rate matching indicator.

In accordance with another aspect of the present disclosure, a method for receiving data in a wireless communication system is provided. The method includes receiving configuration information on rate matching including information on a rate matching resource group from a terminal; receiving aggregation information indicating a number of a plurality of slots for multi-slot scheduling from the terminal; receiving scheduling information including a rate matching indicator indicating whether a rate matching based on the rate matching resource group is performed; identifying a resource for transmitting data based on the aggregation information and the rate matching indicator; and receiving data on the resource in the plurality of slots, wherein the resource in the plurality of slots is identified by excluding resources indicated by the rate matching indicator.

In accordance with another aspect of the present disclosure, a base station for transmitting data in a wireless communication system is provided. The base station includes a transceiver and a controller coupled with the transceiver and configured to transmit configuration information on rate matching including information on a rate matching resource group to a terminal, transmit aggregation information indicating a number of a plurality of slots for multi-slot scheduling to the terminal, transmit scheduling information including a rate matching indicator indicating whether a rate matching based on the rate matching resource group is performed, identify a resource for transmitting data based on the aggregation information and the rate matching indicator, and transmit data on the resource in the plurality of slots, wherein the resource in the plurality of slots is identified by excluding resources indicated by the rate matching indicator.

In accordance with another aspect of the present disclosure, a terminal for receiving data in a wireless communication system is provided. The terminal includes a transceiver and a controller coupled with the transceiver and configured to receive configuration information on a rate matching including information on a rate matching resource group from a terminal, receive aggregation information indicating a number of a plurality of slots for multi-slot scheduling from the terminal, receive scheduling information including a rate matching indicator indicating whether a rate matching based on the rate matching resource group is performed, identify a resource for transmitting data based on the aggregation information and the rate matching indicator, and receive data on the resource in the plurality of slots, wherein the resource in the plurality of slots is identified by excluding resources indicated by the rate matching indicator.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
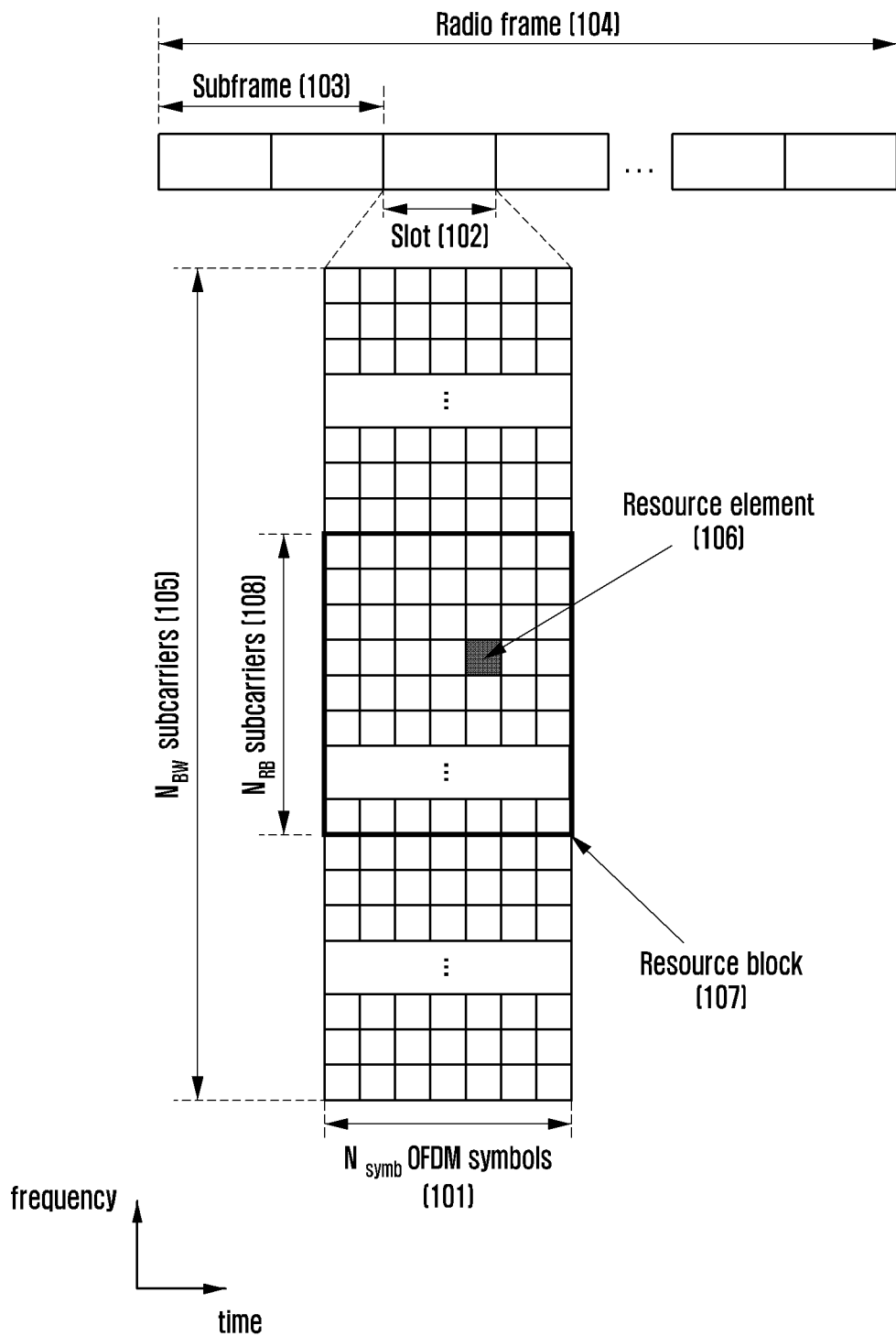
FIG. 1 is a diagram showing a basic structure of a time-frequency region in LTE.

Various embodiments of the present disclosure are described with reference to the accompanying drawings.

In describing the embodiments, a description of contents that are well known in the art to which the disclosure pertains and not directly related to the disclosure is omitted in order to aid in clarity.

For the same reason, in the accompanying drawings, some elements are enlarged, omitted, or depicted schematically. Furthermore, the size of each element does not accurately reflect its real size. In the drawings, the same or similar elements may be assigned the same reference numerals.

Various embodiments of the present disclosure are not limited to particular embodiments, and it should be understood that modifications, equivalents, and/or alternatives of the embodiments described herein can be variously made.

Each block of the flowchart illustrations and combinations of the blocks in the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create a means for executing the functions specified in the flowchart blocks. These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart blocks. The computer program instructions may also be loaded on a computer or other programmable data processing apparatus to cause a series of operational steps to be performed on the computer or other programmable apparatus to produce a computer-executed process, so that the instructions performed on the computer or other programmable data processing apparatus provide steps for executing the functions described in the flowchart blocks.

Furthermore, each block of the flowchart illustrations may represent a portion of a module, a segment, or code, which includes one or more executable instructions for implementing a specified logical function. It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

The term "unit", may mean software or a hardware component, such as a field programmable gate array (FPGA) or an application-specific integrated circuit (ASIC), and the unit may perform specific tasks. However, the term "unit" is not meant to be limited to software or hardware. The unit may advantageously be configured to reside on an addressable storage medium and configured to operate on one or more processors. Accordingly, the unit may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and units may be combined into fewer components and units or may be further separated into additional components and units. Furthermore, the components and units may be implemented to operate on one or more central processing units (CPUs) within a device or a security multimedia card. Also, according to an embodiment, a unit may include one or more processors.

Wireless communication systems are not limited to voice-oriented services and may include wideband wireless communication systems that provide high-speed and high-quality packet data services. For example, wideband wireless communication systems may include communication standards such as high speed packet access (HSPA) of $3^{rd}$ generation partnership project (3GPP), LTE or evolved universal terrestrial radio access (E-UTRA), LTE-Advanced (LTE-A), LTE-Pro, high rate packet data (HRPD) of 3GPP2, ultra mobile broadband (UMB) and 802.16e of the Institute of Electrical and Electronics Engineers (IEEE).

A representative example of the wideband wireless communication system (i.e., an LTE system) may adopt an orthogonal frequency division multiplexing (OFDM) scheme in downlink (DL) and adopt a single carrier frequency division multiple access (SC-FDMA) scheme in uplink (UL). The uplink refers to a radio link in which a user equipment (UE) or a mobile station (MS) transmits data or a control signal to an eNode B (or base station (BS)). The downlink refers to a radio link in which a BS transmits data or a control signal to a UE. In the multi-access scheme, time-frequency resources on which data or control information will be carried for each user are allocated and managed in order to distinguish between the data or control information of users so that the time-frequency resources do not overlap, such that orthogonality is established.

A 5G communication system, that is, a post-LTE communication system, needs to support services satisfying various requirements at the same time because various requirements of users and service providers need to be freely incorporated. Services taken into consideration for the 5G communication system include enhanced mobile broadband (eMBB), massive machine type communication (mMTC), and ultra reliability low latency communication (URLLC).

eMBB provides an enhanced data rate compared to a data rate supported by the existing LTE, LTE-A or LTE-Pro. For example, in the 5G communication system, eMBB should be able to provide a peak data rate of 20 gigabits per second (Gbps) in downlink and a peak data rate of 10 Gbps in uplink with respect to one BS. Furthermore, the 5G communication system should be able to provide an increased user-perceived data rate while providing the peak data rate.

In order to satisfy such a requirement, various transmission and reception technologies including a further enhanced MIMO transmission technology must be improved. Furthermore, the LTE system transmits a signal using a 20 megahertz (MHz) maximum transmission bandwidth in the 2 GHz band. In contrast, the 5G communication system transmits a signal using a frequency bandwidth wider than 20 MHz in a frequency band of 3 to 6 GHz or more, and thus can satisfy the data rates necessary for the 5G communication system.

Furthermore, in the 5G communication system, mMTC is taken into consideration in order to support application services, such as IoT. Access by many UEs within a single cell, coverage improvement of a UE, an increased battery time, a reduction in the cost of a UE are required in order for mMTC to efficiently provide for the IoT. The IoT is attached to various sensors and various devices to provide a communication function, and thus should be able to support many UEs (e.g., 1,000,000 UEs/kilometer $(km)^2$) within a cell. Furthermore, a UE supporting mMTC requires wider coverage compared to other services provided by the 5G communication system because there is a good possibility that the UE may be located in a shadow area not covered by a cell, such as the underground of a building. A UE supporting mMTC needs to be a cheap UE, and requires a very long battery life time, such as 10 to 15 years, because it is difficult to frequently replace the battery of the UE.

URLLC is a mission-critical cellular-based wireless communication service, such as remote control of robots or machinery, industrial automation, service used for unmanned aerial vehicles, remote health care, and emergency alert. Accordingly, communication provided by URLLC should be very low latency and very high reliability. For example, services supporting URLLC may require air interface latency to be less than 0.5 millisecond and also a packet error rate of $10^{-5}$ or less. Accordingly, for services supporting URLLC, the 5G system needs to provide a transmission time interval (TTI) less than that of other services, and also requires the design for allocating resources in a wide frequency band in order to secure reliability of a communication link.

Three services of the 5G system, that is, eMBB, URLLC, and mMTC, may be multiplexed and transmitted in one system. In order to satisfy different requirements of the services, different transmission and reception schemes and parameters may be used between the services.

Hereinafter, the frame structures of LTE and LTE-A systems are described more specifically with reference to the drawings.

FIG. 1 is a diagram showing a basic structure of a time-frequency region, that is, a radio resource region in which data or a control channel is transmitted in the downlink of an LTE system.

In FIG. 1, a horizontal axis indicates a time region, and a vertical axis indicates a frequency region. A minimum transmission unit in the time region is an OFDM symbol. $N_{symb}$ OFDM symbols 101 gather to form one slot 102, and two slots gather to form one subframe 103. The length of a slot is 0.5 ms, and the length of a subframe is 1.0 ms. Furthermore, a radio frame 104 is a time region unit including 10 subframes. A minimum transmission unit in the frequency region is a subcarrier. The transmission bandwidth of the entire system transmission band includes a total of $N_{BW}$ subcarriers 105. The basic unit of a resource in the time-frequency region is a resource element (RE) 106, and may be represented by an OFDM symbol index and a subcarrier index. A resource block (RB) or physical resource block (PRB) 107 is defined by contiguous $N_{symb}$ OFDM symbols 101 in the time region and contiguous $N_{RB}$ subcarriers 108 in the frequency region. Accordingly, one RB 108 includes $N_{symb} \times N_{RB}$ REs 106. In general, a minimum transmission unit of data is an RB unit. In the LTE system, in general, $N_{symb}=7$, $N_{RB}=12$, and $N_{BW}$ is proportional to the bandwidth of a system transmission band.

In the LTE system, scheduling information for downlink data or uplink data is delivered from a base station to a UE through downlink control information (DCI). The DCI is defined in various formats, and is applied and managed as a defined DCI format depending on whether the DCI is scheduling information for uplink data or scheduling information for downlink data, whether the DCI is compact DCI having a small size of control information, whether spatial multiplexing using multiple antennas is applied, whether the DCI is DCI for power control and so on. For example, if the DCI format is 1, scheduling control information for downlink data may be configured to include, at least, the following control information:

A resource allocation type 0/1 flag provides notification of whether a resource allocation method is Type 0 or Type 1. In Type 0, a resource is allocated in a resource block group (RBG) unit by applying a bitmap method. A basic unit of scheduling in the LTE system is an RB represented as time and frequency region resources. An RBG includes a plurality of RBs and is a basic unit of scheduling in the Type 0 method. In Type 1, a given RB is allocated within an RBG.

A resource block assignment provides notification of an RB allocated to data transmission. A represented resource is determined based on a system bandwidth and a resource allocation method.

A modulation and coding scheme (MCS) provides notification of a modulation method used for data transmission and the size of a transport block, i.e., data to be transmitted.

A hybrid automated repeat request (HARQ) process number provides notification of a process number of HARQs.

A new data indicator provides notification of a HARQ initial transmission or retransmission.

A redundancy version provides notification of a redundancy version of HARQ.

A transmit power control (TPC) command for a physical uplink control channel (PUCCH) provides notification of a TPC command for a PUCCH, i.e., an uplink control channel.

The DCI is transmitted through a PDCCH or an enhanced PDCCH (EPDCCH), i.e., a downlink physical control channel, according to a channel coding and modulation process.

A cyclic redundancy check (CRC) is attached to a DCI message payload. The CRC is scrambled as a radio network temporary identifier (RNTI) corresponding to the identification (ID) of a UE. Different RNTIs are used depending on an object of a DCI message, for example, UE-specific data transmission, a power control command or a random access response. That is, the RNTI is not explicitly transmitted, and is included in a CRC calculation process and transmitted. When a DCI message transmitted on a PDCCH is received, a UE identifies a cell-specific reference signal (CRS) using an allocated RNTI. If CRC results are correct, the UE may be aware that the corresponding message has been transmitted to the UE.

Figure 2:
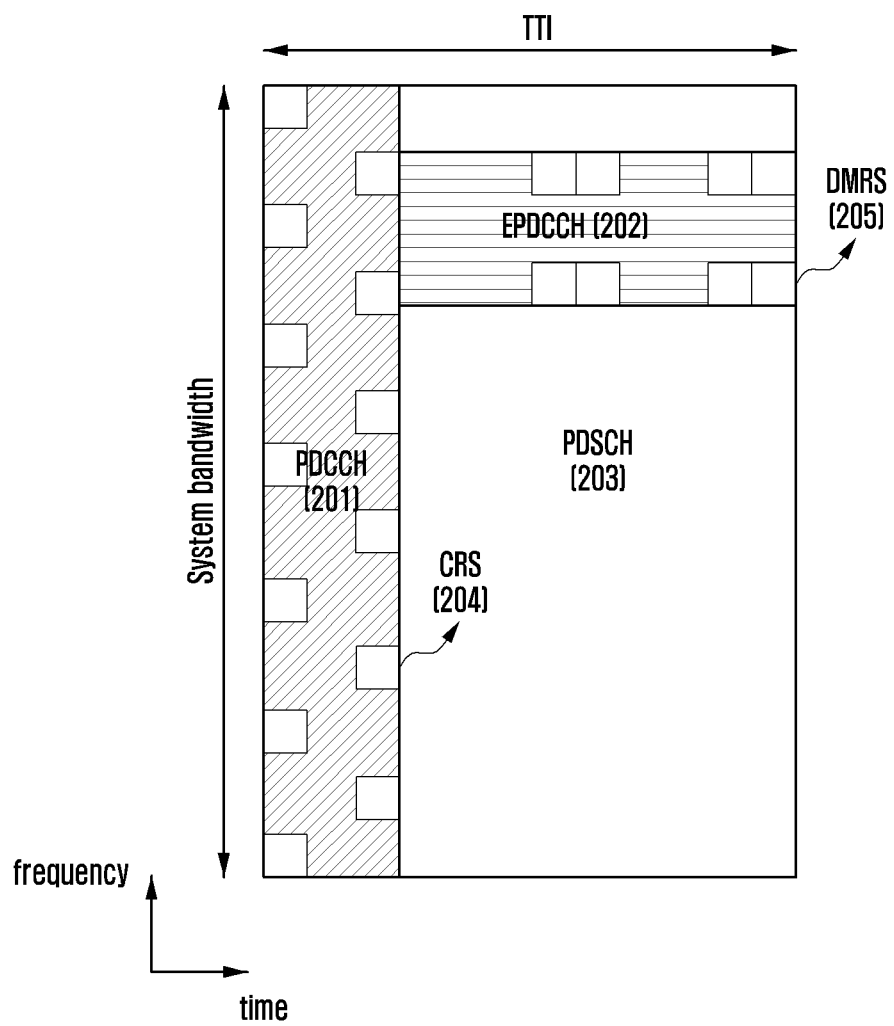
FIG. 2 is a diagram showing a downlink control channel of LTE.

FIG. 2 is a diagram showing a PDCCH and an EPDCCH, i.e., downlink physical channels in which DCI of LTE is transmitted.

Referring to FIG. 2, a PDCCH 201 is multiplexed with a PDSCH 203, i.e., a data transmission channel, and is transmitted in a full system bandwidth. The region of the PDCCH 201 is represented by the number of OFDM symbols. This is indicated as a control format indicator (CFI), transmitted through a physical control format indicator channel (PCFICH), with respect to a UE. By allocating the PDCCH 201 to an OFDM symbol at the front of a subframe, the UE can decode downlink scheduling allocation information as soon as possible. Accordingly, there is an advantage in that decoding latency for a downlink-shared channel (DL-SCH), i.e., overall downlink transmission latency, can be reduced. One PDCCH carries one DCI message, and multiple UEs can be scheduled in the downlink and uplink at the same time. Accordingly, multiple PDCCHs can be transmitted within each cell at the same time.

A CRS 204 is used as a reference signal for the decoding the PDCCH 201. A CRS 204 is transmitted every subframe in a full band, and scrambling and resource mapping is different based on a cell ID. The CRS 204 is a reference signal used by all UEs in common, so UE-specific beamforming cannot be used in the CRS. Accordingly, a multiple antenna transmission scheme for the PDCCH of the LTE system is limited to open-loop transmit diversity. A UE is implicitly notified of the number of ports of the CRS through the decoding of a physical broadcast channel (PBCH).

Resource allocation for the PDCCH 201 is based on a control-channel element (CCE). One CCE includes 9 resource element groups REGs, that is, a total of 36 resource elements REs. The number of CCEs for the given PDCCH 201 may be 1, 2, 4 or 8, and depends on the channel coding rate of the DCI message payload. As described above, different numbers of CCEs are used to implement the link adaptation of the PDCCH 201.

A UE has to detect a signal in a state in which the UE is unaware of information on the PDCCH 201. In the LTE system, a search space indicative of a set of CCEs has been defined for blind decoding. A plurality of sets of the search spaces are configured in an aggregation level (AL) of each CCE. This is not explicitly signaled, and is implicitly defined through a function based on a UE ID and a subframe number. A UE performs decoding on the PDCCH 201 with respect to all resource candidate groups that may be generated from CCEs within a configured search space in each subframe, and processes information declared to be valid with respect to the corresponding UE through CRC.

The search space is divided into a UE-specific search space and a common search space. UEs or all the UEs of a given group may search the common search space of the PDCCH 201 in order to reduce dynamic scheduling for system information or cell-common control information, such as a paging message. For example, scheduling allocation information of a DL-SCH for the transmission of a system information block (SIB)-1, including service provider information of a cell, may be received by searching the common search space of the PDCCH 201.

Referring to FIG. 2, the EPDCCH 202 is frequency-multiplexed with the PDSCH 203 and transmitted. A BS may properly allocate the resource of the EPDCCH 202 and the PDSCH 203 through scheduling. Accordingly, coexistence with data transmission for the existing LTE UE can be effectively supported. However, there may be reduced performance from the perspective of the transmission latency time because the EPDCCH 202 is allocated to a single full subframe in the time axis and transmitted. Multiple EPDCCHs 202 configure one EPDCCH set. The allocation of an EPDCCH set has a PRB pair unit. Location information for the EPDCCH set is configured in a UE-specific manner, and is signaled through radio resource control (RRC). A maximum of two EPDCCH sets may be configured to each UE. One EPDCCH set may be multiplexed and configured in different UEs at the same time.

The resource allocation of the EPDCCH 202 is based on an enhanced CCE (ECCE). One ECCE may include 4 or 8 enhanced REGs (EREGs). The number of EREGs per ECCE is different depending on a CP length and subframe configuration information. One EREG includes 9 REs. Accordingly, 16 EREGs may be per PRB pair. An EPDCCH transmission method is divided into localized or distributed transmission depending on an RE mapping method of an EREG. The aggregation level of an ECCE may be one of 1, 2, 4, 8, 16, or 32, and is determined based on a CP length, a subframe configuration, an EPDCCH format and/or a transmission method.

The EPDCCH 202 supports only a UE-specific search space. Accordingly, a UE attempting to receive a system message must search the common search space in the existing PDCCH 201.

In the EPDCCH 202, a demodulation reference signal (DMRS) 205 is used as a reference signal for decoding. Accordingly, the precoding of the EPDCCH 202 may be configured by a base station and may use UE-specific beamforming. The UEs may perform decoding on the EPDCCH 202 through the DMRS 205, although they are unaware which precoding is used. The same pattern as a DMRS of the PDSCH 203 is used for the DMRS 205 of the EPDCCH 202. However, unlike the PDSCH 203, the DMRS 205 of the EPDCCH 202 may support transmission using a maximum of 4 antenna ports. The DMRS 205 is transmitted only in a corresponding PRB in which the EPDCCH is transmitted.

Port configuration information of the DMRS 205 is different depending on a transmission method of the EPDCCH 202. In the case of localized transmission method, an antenna port corresponding to an ECCC to which the EPDCCH 202 is mapped is selected based on the ID of a UE. If different UEs share the same ECCE, that is, if multiuser MIMO transmission can be used, a DMRS antenna port may be allocated to the UEs. Alternatively, a BS may share the antenna port of the DMRS 205 and transmit the EPDCCH. In this case, the DMRS may be identified as the scrambling sequence of the DMRS 205 configured through higher layer signaling. In the case of the distributed transmission method, two antenna ports are supported for the DMRS 205. A diversity scheme of a precoder cycling method is supported. The DMRS 205 may be shared with respect to all REs transmitted within one PRB pair.

The search space of LTE is described more specifically below. In the LTE system, the entire PDCCH region includes a set of CCEs in the logical region and includes a search space including a set of CCEs. The search space is divided into a common search space and a UE-specific search space. A search space for an LTE PDCCH is defined as below.

The set of PDCCH candidates to monitor are defined in terms of search spaces, where a search space $S_k^{(L)}$ at aggregation level $L \in \{1,2,4,8\}$ is defined by a set of PDCCH candidates. For each serving cell on which PDCCH is monitored, the CCEs corresponding to PDCCH candidate m of the search space $S_k^{(L)}$ are given by $$L\{(Y_k+m') \bmod \lfloor N_{CCE,k}/L \rfloor\}+i$$

where $Y_k$ is defined below, i=0, ..., L−1. For the common search space m'=m. For the PDCCH UE specific search space, for the serving cell on which PDCCH is monitored, if the monitoring UE is configured with carrier indicator field then $m'=m+M^{(L)} \cdot n_{CI}$ where $n_{CI}$ is the carrier indicator field value, else if the monitoring UE is not configured with carrier indicator field then m'=m, where m=0, ..., $M^{(L)}$−1. $M^{(L)}$ is the number of PDCCH candidates to monitor in the given search space.

Note that the carrier indicator field value is the same as ServCellIndex

For the common search spaces, $Y_k$ is set to 0 for the two aggregation levels L=4 and L=8.

For the UE-specific search space $S_k^{(L)}$ at aggregation level L, the variable $Y_k$ is defined by $$Y_k=(A \cdot Y_{k-1}) \bmod D$$

where $Y_{-1}=n_{RNTI} \neq 0$, A=39827, D=65537 and $k=\lfloor n_s/2 \rfloor$, is the slot number within a radio frame.

The RNTI value used for $n_{RNTI}$ is defined in subclause 7.1 in downlink and subclause 8 in uplink.

In accordance with the above-described definition of the search space for the PDCCH, the UE-specific search space is not explicitly signaled and is implicitly defined through a function based on a UE ID and a subframe number. In other words, the UE-specific search space may be changed over time because it may be changed based on a subframe number. Accordingly, a problem in which a given UE does not use a search space due to other UEs (this is defined a blocking problem) is solved. If a given UE is not scheduled within a corresponding subframe because all CCEs monitored by the given UE are already used by other UEs scheduled within the same subframe, such a problem may not occur in a next subframe because such a search space is different over time. For example, although the UE-specific search spaces of a first UE and a second UE are partially overlapped in a given subframe, overlap in a next subframe may be expected to be different because the UE-specific search space is changed for each subframe.

In accordance with the above-described definition of the search space for the PDCCH, the common search space is defined as a set of already agreed upon CCEs because UEs or all the UEs of a given group have to receive the PDCCH. In other words, the common search space is not changed depending on the ID of a UE or a subframe number. The common search space is present for the transmission of various system messages, but may also be used to transmit control information of an individual UE. Accordingly, the common search space may also be used as a solution for a phenomenon in which a UE is not scheduled due to the shortage of resources available for a UE-specific search space.

A search space is a set of candidate control channels including CCEs at which a UE needs to attempt decoding on a given aggregation level. A UE has a plurality of search spaces because there are several aggregation levels in which 1, 2, 4, or 8 CCEs form one group. The number of PDCCH candidate groups that need to be monitored by a UE within a search space defined based on an aggregation level in an LTE PDCCH is defined by the following Table 1.

TABLE 1

| | Search space $S_k^{(L)}$ | | Number of |
|---|---|---|---|
| Type | Aggregation level L | Size [in CCEs] | PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Table 1, a UE-specific search space supports an aggregation level {1, 2, 4, 8}, which has {6, 6, 2, 2} PDCCH candidate groups, respectively. A common search space supports an aggregation level {4, 8}, which has {4, 2} PDCCH candidate groups, respectively. The reason why the common search space supports the aggregation level {4, 8} only is to yield better coverage characteristics because in general, a system message must reach up to a cell edge.

Only given DCI formats, such as 0/1A/3/3A/1C corresponding to uses for a system message or power control of a UE group, may be transmitted in the common search space. A DCI format supporting spatial multiplexing is not supported in the common search space. A downlink DCI format to be decoded in a UE-specific search space is different based on a transmission mode configured in a corresponding UE. An accurate subframe number regarding when a corresponding configuration will be effective with respect to a corresponding UE has not been designated because the configuration of a transmission mode is performed through RRC signaling. Accordingly, a UE may operate to maintain a communication connection state by always performing decoding on the DCI format 1A regardless of a transmission mode.

Hereinafter, a downlink control channel in a 5G communication system is described.

Figure 3:
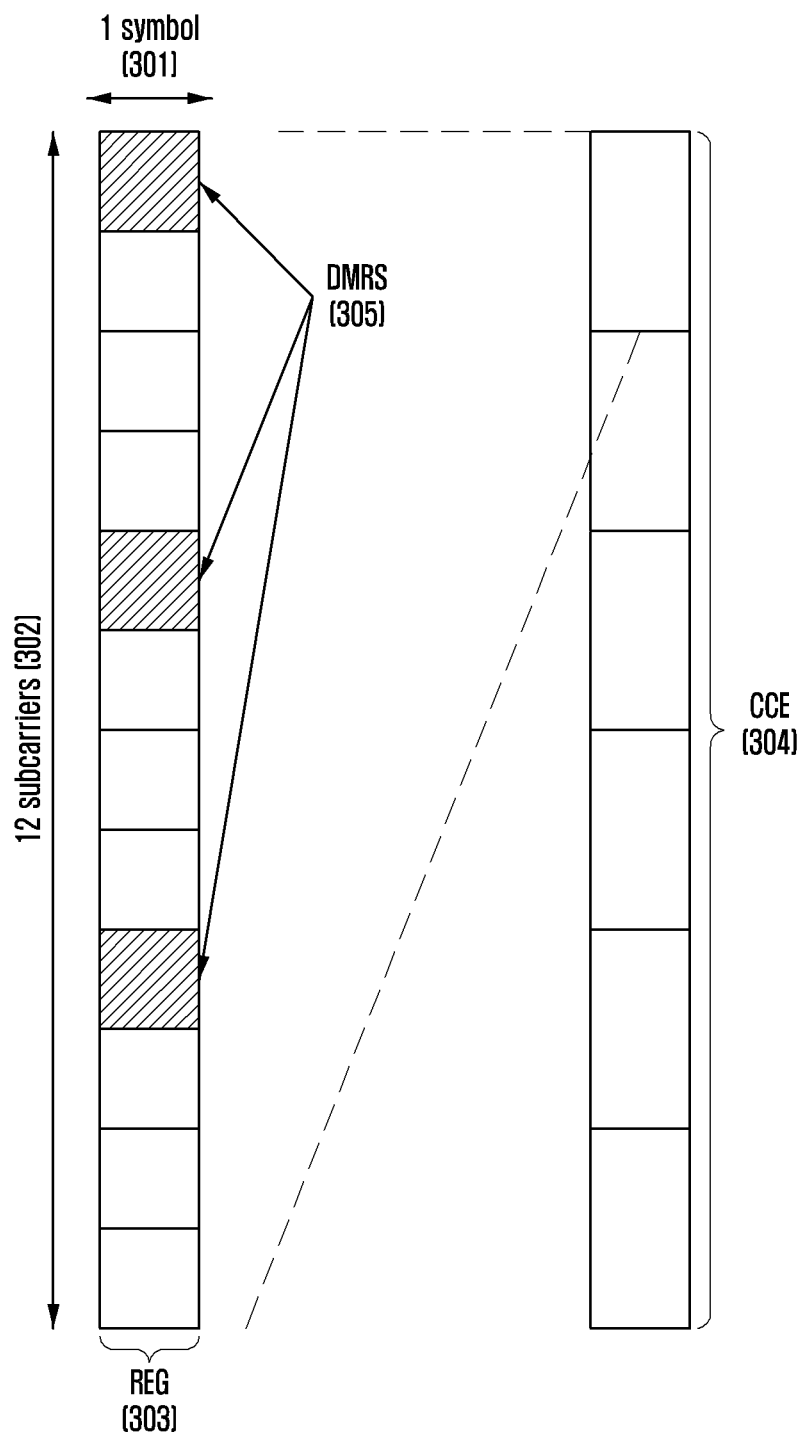
FIG. 3 is a diagram showing a transmission resource of a downlink control channel in 5G.

FIG. 3 is a diagram showing an example a basic unit of time and frequency resources configuring a downlink control channel which may be used in a 5G system.

Referring to FIG. 3, a basic unit (REG 303) of time and frequency resources configuring a control channel includes one OFDM symbol 301 in a time axis and 12 subcarriers 302, that is, 1 RB, in a frequency axis. In configuring the REG 303 of the control channel, the REG 303 of the time axis is assumed to be the 1 OFDM symbol 301 and thus a data channel and a control channel may be time-multiplexed within one subframe. A latency time requirement can easily be satisfied because the processing time of a user is reduced by positioning a control channel ahead of a data channel. Furthermore, frequency multiplexing a control channel and a data channel can be efficiently performed by configuring the frequency-domain REG 303 of the control channel using the 1 RB 302.

Control channel regions of various sizes may be configured by connecting a REG 303 shown in FIG. 3. For example, if a basic unit by which a downlink control channel is allocated in the 5G system is a CCE 304, one CCE 304 may include multiple REGs 303. The REG 303 shown in FIG. 3 is described as an example. This means that if the REG 303 includes 12 REs and one CCE 304 includes 6 REGs 303, the one CCE 304 includes 72 REs. If a downlink control region is configured, the corresponding region may include multiple CCEs 304. A given downlink control channel may be mapped to one or multiple CCEs 304 based on an aggregation level (AL) within a control region and transmitted. The CCEs 304 within the control region may be distinguished based on a number. In this case, the number may be assigned according to a logical mapping method.

A REG 303 of the downlink control channel shown in FIG. 3 may include all regions to which REs to which DCI is mapped and a DMRS 305, that is, a reference signal for decoding the REs, are mapped. As in FIG. 3, three DMRSs 305 may be transmitted in one REG 303.

Figure 4:
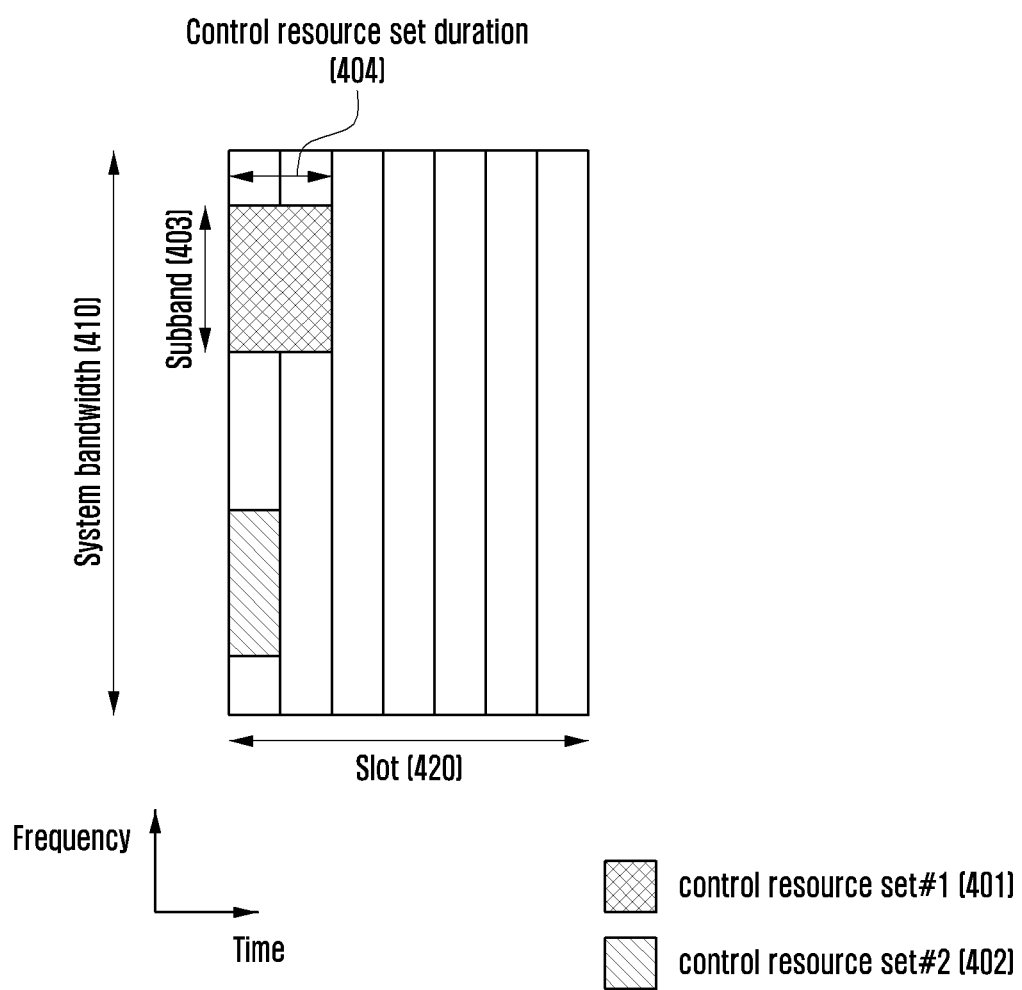
FIG. 4 is a diagram showing an example of a configuration for a control region in 5G.

FIG. 4 is a diagram showing an example of a configuration for a control region in 5G, that is, a control resource set (CORESET) in which a downlink control channel is transmitted in a 5G communication system. FIG. 4 shows an example in which a system bandwidth 410 in a frequency axis and two CORESETs (CORESET #1 401 and CORESET #2 402) within one slot 420 (1 slot is assumed to be 7 OFDM symbols in the example of FIG. 4) in a time axis have been configured. The CORESET 401, 402 may be configured as a given subband 403 within the full system bandwidth 410 in the frequency axis. The CORESET may be configured as one or multiple OFDM symbols in the time axis, which may be defined as control resource set duration 404. In the example of FIG. 4, the CORESET #1 401 is configured as control resource set duration of 2 symbols, and the CORESET #2 402 is configured as control resource set duration of 1 symbol.

The above-described control region in the 5G system may be configured by a BS with respect to a UE through higher layer signaling (e.g., system information, a master information block (MIB), or RRC signaling). If a control region is configured in a UE, this means that information on the location of the control region, a subband, resource allocation of the control region, and control resource set duration are provided to a UE. For example, such information may include information illustrated in Table 2.

TABLE 2

| | |
|---|---|
| Configuration information 1 | Frequency axis RB allocation information Configuration information |
| Configuration information 2 | CORESET start symbol |
| Configuration information 3 | CORESET symbol length |
| Configuration information 4 | REG bundling size |
| Configuration information 5 | Transmission mode (Interleaved transmission method or Non-interleaved transmission mode |
| Configuration information 6 | DMRS configuration information |
| Configuration information 7 | Search space type (common search space, group-common search space, UE-specific search space) |
| Configuration information 8 | Monitoring period |
| Other information | |

In addition to the configuration information, various types of information necessary to transmit the downlink control channel may be configured in a UE.

Figure 5:
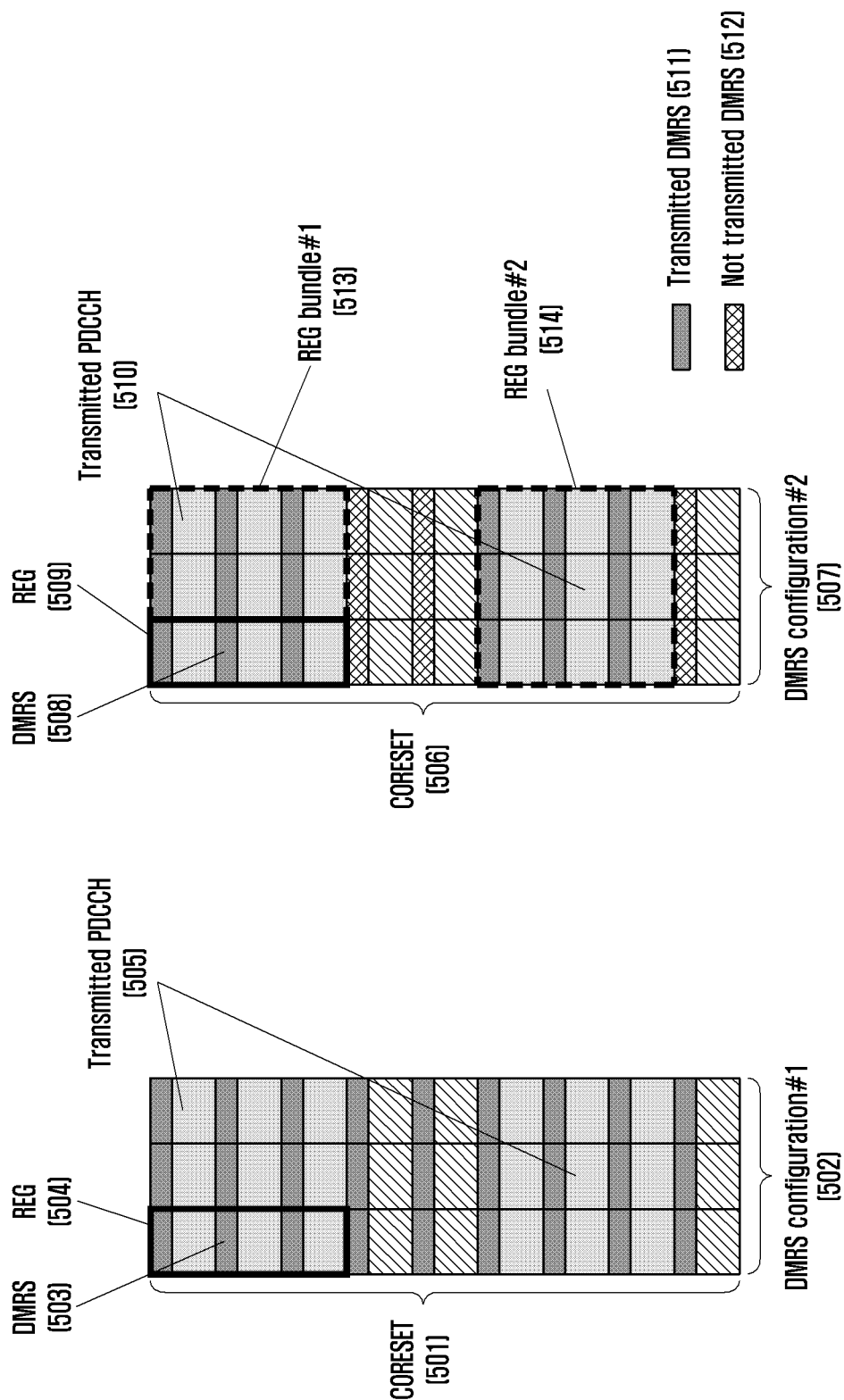
FIG. 5 is a diagram showing a method of transmitting a demodulation reference signal (DMRS) of a downlink control channel in 5G.

FIG. 5 is a diagram showing an example of a DMRS configuration for a downlink control channel in a 5G communication system.

In a 5G system, a CORESET may be configured as one of a DMRS configuration #1 502 or a DMRS configuration #2 507.

If a CORESET is configured as the DMRS configuration #1 502, this may mean that DMRSs to which the same precoding has been applied are mapped to all REGs within the CORESET and transmitted with respect to all contiguous RBs within the CORESET.

In the example of FIG. 5, a CORESET 501 has been illustrated as being configured as a DMRS configuration #1 502. A DMRS 503 may be transmitted in all the REGs 504 within the CORESET 501. In this case, the DMRS 503 may be transmitted in a REG 504 to which a transmitted PDCCH is not mapped. Furthermore, the same precoding may be applied to all the transmitted DMRSs 503. A UE that monitors the CORESET 501 configured as the DMRS configuration #1 502 may perform channel estimation on the CORESET 501, assuming that the same precoding is applied to the DMRSs 503 and the DMRSs are transmitted within all the REGs 504 within the CORESET 501, and may perform blind decoding on the PDCCH 505 based on the estimated channel information.

If a CORESET is configured as the DMRS configuration #2, this may mean that DMRSs to which the same precoding has been applied in a configured REG bundle unit are mapped and transmitted to a REG in which a PDCCH is actually transmitted.

In FIG. 5, a CORESET 506 is illustrated as being configured as the DMRS configuration #2 507. A DMRS 508 may be transmitted in an REG 509 in which a PDCCH 510 is actually transmitted within the CORESET 506. Accordingly, an actually transmitted DMRS 511 and a DMRS 512 which is not transmitted may be present within the CORESET 506 depending on whether the PDCCH 510 is transmitted. Furthermore, the same precoding may be applied to the transmitted DMRS 511 within a REG bundle. For example, in FIG. 5, if one transmission PDCCH 510 is configured with two REG bundles, that is, a REG bundle #1 513 and a REG bundle #2 514, the same precoding may be applied to all DMRSs 511 transmitted within the REG bundle #1 513, and the same precoding may be applied to all DMRSs 511 transmitted within the REG bundle #2 514. The size of the REG bundle is part of the configuration of the CORESET 506 and may be configured by a BS with respect to a UE.

A UE that monitors the CORESET 506 configured as the DMRS configuration #2 507 may perform channel estimation, assuming that the same precoding is applied to DMRSs in a configured REG bundle unit and the DMRSs are transmitted, and may perform blind decoding on the PDCCH 510 based on the estimated channel information.

A resource mapping method (e.g., CCE-to-REG mapping method) for a 5G downlink control channel may include a non-interleaving method and an interleaving method. The non-interleaving mapping method may be a mapping method for multiple contiguous REGs to configure one CCE. The interleaving mapping method may be a mapping method for multiple non-contiguous REGs to configure one CCE. A preferred mapping method may be different depending on a method of transmitting a downlink control channel. For example, a transmit diversity transmission method may be used for a PDCCH in order to improve reception performance. In this case, the interleaving mapping method may be applied to maximize frequency diversity. Alternatively, if UE-specific beamforming may be used for PDCCH transmission, the non-interleaving mapping method may be used to maximize a beamforming gain in a given subband in which a PDCCH is transmitted.

A method of configuring a bandwidth part (BWP) in a 5G communication system is described below.

Figure 6:
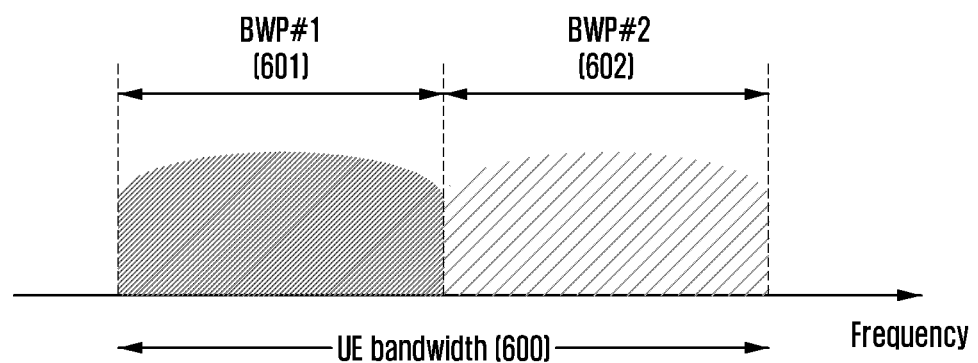
FIG. 6 is a diagram showing an example of a bandwidth part configuration in 5G.

FIG. 6 is a diagram showing an example of a configuration for a BWP in a 5G communication system. FIG. 6 shows an example in which a UE bandwidth 600 is configured with two BWPs, that is, a BWP #1 601 and a BWP #2 602. A BS may configure one or multiple BWPs with respect to a UE. Information in Table 3 may be configured in each of the BWPs.

TABLE 3

| | |
|---|---|
| Configuration information 1 | Bandwidth of a BWP (the number of PRBs configuring the BWP) |
| Configuration information 2 | Frequency location of a BWP based on a reference point versus an offset value (the reference point may be the center frequency of a carrier, a synchronization signal, or a synchronization signal raster) |
| Configuration information 3 | Numerology of a BWP (e.g., subcarrier spacing, or a cyclic prefix (CP)) |
| Other information | |

In addition to the configuration information, various parameters related to a BWP may be configured in a UE. The information may be delivered from a BS to a UE through higher layer signaling, for example, RRC signaling. At least one configured BWP or multiple BWPs may be activated. A configured BWP may activated by being semi-statically delivered through RRC signaling or dynamically delivered through a media access control (MAC) control element (CE) or DCI from a BS to a UE.

The configuration of a BWP supported in a 5G system may be used for various purposes.

For example, a BWP configuration may provide support for when a bandwidth supported by a UE is smaller than a system bandwidth. For example, a BS may configure the frequency location (configuration information 2) of a BWP in Table 3 with respect to a UE, so that the UE may transmit and receive data in a given frequency location within a system bandwidth.

Additionally, a BS may configure multiple BWPs in a UE in order to support different numerologies. For example, in order to support both data transmission and reception using subcarrier spacing of 15 kHz and subcarrier spacing of 30 kHz with respect to a UE, a BS may configure two BWPs as the subcarrier spacings of 15 kHz and 30 kHz, respectively. The different BWPs may be subjected to frequency division multiplexing. If data is to be transmitted and received based on given subcarrier spacing, a BWP configured as the given subcarrier spacing may be activated.

In addition, a BS may configure bandwidths of different sizes in a UE in order to reduce power consumption of the UE. For example, if a UE supports a very large bandwidth, for example, a bandwidth of 100 MHz and always transmits and receives data using the corresponding bandwidth, the power consumption may be very large. In particular, power will not be used efficiently if monitoring is performed on an unnecessary downlink control channel using a large bandwidth of 100 MHz in the state in which traffic is not present. In order to reduce power consumption of the UE, a BS may configure a BWP having a relatively small bandwidth, for example, a BWP of 20 MHz with respect to the UE. The UE may perform a monitoring operation in the 20 MHz BWP when there is no traffic. When data occurs, the UE may transmit and receive the data using a BWP of 100 MHz under the instruction of the BS.

A method of configuring a rate matching resource for the rate matching of a 5G communication system is described below. Rate-matching means that the size of a signal is controlled by taking into consideration the amount of resources capable of transmitting the signal. For example, the rate matching of a data channel means that the amount of data is adjusted without mapping and transmitting the data channel with respect to a given time and frequency resource region.

Figure 7:
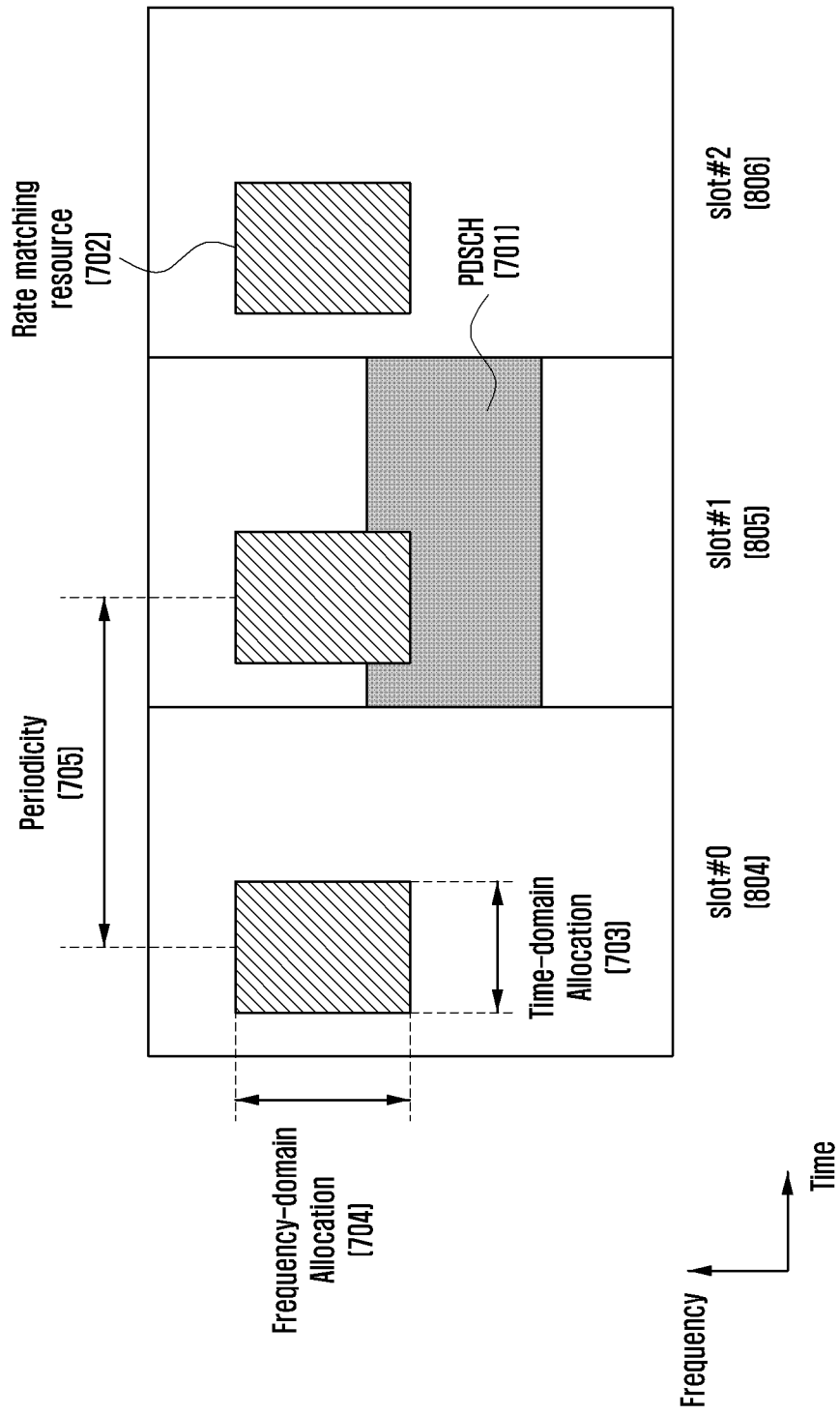
FIG. 7 is a diagram showing an example of rate matching for a data channel in 5G.

FIG. 7 is a diagram showing an example of rate matching for a data channel in a 5G communication system.

FIG. 7 shows a downlink data channel 701 and a rate matching resource 702. A BS may configure one or multiple rate matching resources 702 in a UE through higher layer signaling (e.g., RRC signaling). Configuration information of the rate matching resource 702 may include time-domain resource allocation information 703, frequency-domain resource allocation information 704, and periodicity information 705. If some or all of the time and frequency resources of the scheduled data channel 701 overlaps the configured rate matching resource 702, a BS may rate-match the data channel 701 in the rate matching resource 702 part and transmit it. A UE may perform reception and decoding, assuming that the data channel 701 has been rate-matched in the rate matching resource 702 part.

The BS may dynamically notify the UE whether the data channel will be rate-matched in the configured rate matching resource part through DCI through an additional configuration. Specifically, the BS may select some of the configured rate matching resources, may group the selected resources into a rate matching resource group, and may indicate whether the data channel has been rate-matched with each rate matching resource group through DCI using a bitmap method with respect to the UE. For example, if four rate matching resources RMR #1, RMR #2, RMR #3 and RMR #4 have been configured, the BS may configure RMG #1={RMR #1, RMR #2} and RMG #2={RMR #3, RMR #4} as rate matching groups, and may indicate whether rate matching in each of RMG #1 and RMG #2 has been performed using 2 bits of a DCI field with respect to the UE in the form of a bitmap. For example, the BS may indicate "1" if rate matching needs to be performed, and may indicate "0" if rate matching do not need to be performed.

An indicator indicating whether a data channel has been rate-matched with a rate matching resource is referred to as a "rate matching indicator."

A method of scheduling a data channel in a 5G communication system is described below.

Figure 8:
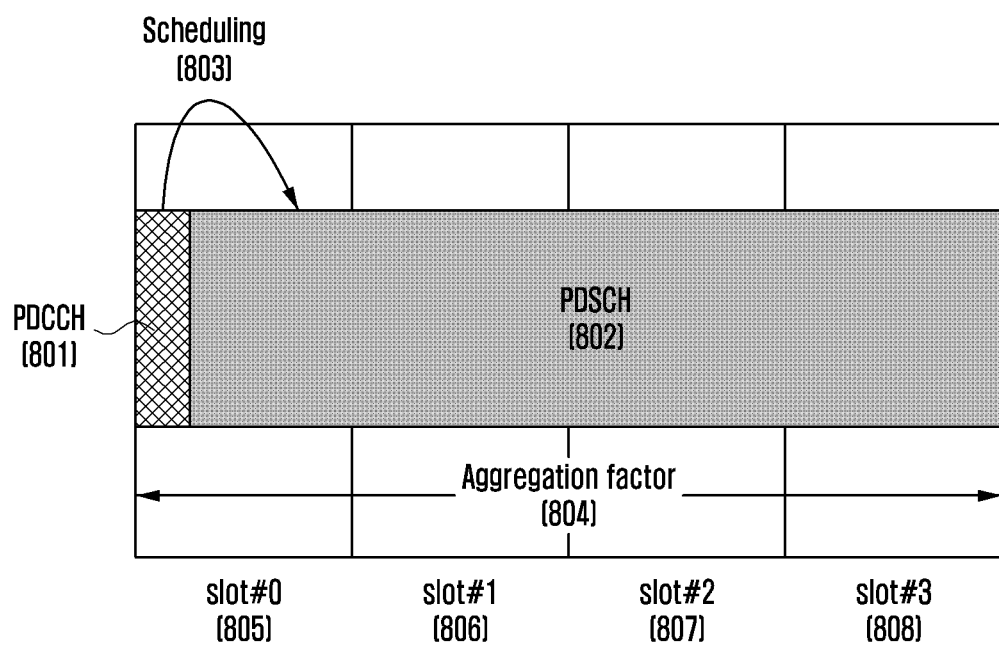
FIG. 8 is a diagram showing an example of multi-slot scheduling for a data channel in 5G.

FIG. 8 shows an example of multi-slot scheduling supported in a 5G system. A BS may semi-statically configure an aggregation factor 804 for data channel scheduling in a UE through higher layer signaling (e.g., RRC signaling). The aggregation factor 804 may have a value of 1, 2, 4 or 8, for example. The BS may notify the UE of scheduling information on the data channel through DCI. The UE may obtain the final scheduling information on the data channel by combining the scheduling information received through the DCI and information of the configured aggregation factor 804.

FIG. 8 shows an example in which the aggregation factor 804 is set to 4 with respect to a downlink data channel 802. A BS may indicate information on scheduling 803 for the data channel 802 using a downlink control channel 801 with respect to a UE. The UE may receive the data channel 802, assuming that the scheduling information on the data channel 802 received through DCI is repeated as many as the set aggregation factor 804. For example, when the aggregation factor 804 is 4, the downlink data channel 802 may be transmitted in four slots.

First Embodiment

According to an embodiment, in the case of multi-slot scheduling such as that described above, an indicator indicating whether a data channel will be rate-matched may have a difficulty in determining rate matching for multiple slots because the indicator is transmitted just once through a corresponding DCI. Accordingly, an embodiment of the disclosure provides a method of determining rate matching under multi-slot scheduling and BS and UE procedures according to the method.

A BS may configure a rate matching resource (RMR) in a UE through higher layer signaling, and may configure whether rate matching for the configured RMR will be dynamically indicated (i.e., whether an RMI will be transmitted through DCI) through higher layer signaling. The BS may indicate whether rate matching will be performed to the UE through DCI with respect to the RMR configured to dynamically indicate the rate matching. In this case, the RMI may be transmitted in a given field of the DCI that schedules data.

A BS may configure multi-slot scheduling for a data channel with respect to a UE through higher layer signaling. Specifically, the BS may determine scheduling for a data channel by setting the parameter value of an aggregation factor, based on how many slots the data channel will be transmitted through. For example, when the aggregation factor is set as K, the data channel may be scheduled in K slots and transmitted. Accordingly, the UE may obtain scheduling information on the data channel from DCI, and may obtain the final scheduling information of data based on the obtained scheduling information by taking into consideration the set aggregation factor.

If a BS has configured multi-slot scheduling for a data channel with respect to a UE, an RMI received through DCI may be identically applied to all slots in which the data channel has been scheduled using a method of determining whether rate matching will be performed on a data channel scheduling with a multi-slot.

For example, if an aggregation factor is set as K and DCI is detected in an n-th slot, a data channel scheduled based on the DCI may be transmitted in m, m+1, . . . , m+K (m≥n) slots.

If an RMI within corresponding DCI indicates that rate matching for an RMR should not be performed, rate matching for the RMR may not be performed with respect to all the slots in which the data channel has been scheduled, that is, the m, m+1, . . . , m+K slots.

If an RMI within corresponding DCI indicates that rate matching for an RMR has to be performed, rate matching for the RMR may be performed with respect to all slots in which the data channel has been scheduled, that is, the m, m+1, . . . , m+K slots.

In performing the method, the contents of the RMI may be applied to only a slot that belongs to slots in which the data channel is transmitted and in which the RMR is actually present based on periodicity information configured in the RMR.

Alternatively, in performing the method, the contents of the RMI may be identically applied to all slots in which the data channel is transmitted regardless of periodicity information configured in the RMR.

A BS may determine whether rate matching for an RMR should be performed with respect to all the slots in which a data channel is scheduled depending on the method. That is, the same rate matching may or may not be applied to all the slots. The BS may schedule the data channel by taking this into consideration, transmit the data channel, and thus may transmit an RMI to a UE.

The UE may receive the RMI from the BS. The UE may identically apply information of the received RMI to all the slots in which the data channel has been scheduled.

Figure 9:
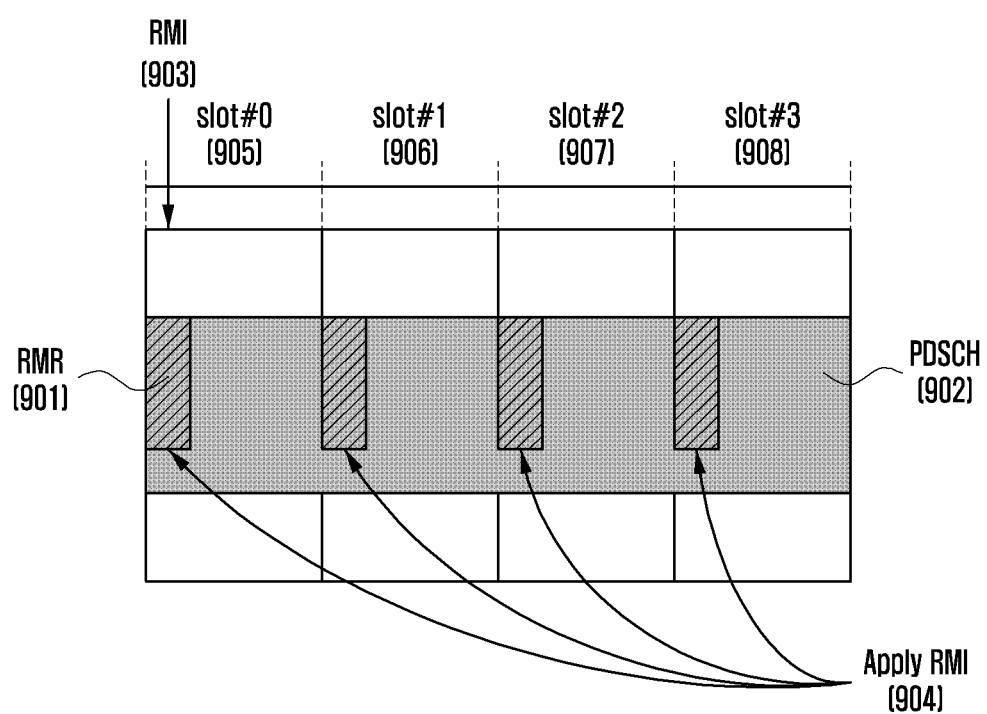
FIG. 9 is a diagram showing a configuration of a rate matching resource (RMR) according to an embodiment of the disclosure.

FIG. 9 is a diagram showing a configuration of a rate matching resource (RMR), according to an embodiment.

Referring to FIG. 9, an RMR 901 is configured and periodicity is 1 slot. That is, the RMR 901 may be present at the same time and frequency location in each slot. Furthermore, it is assumed that DCI is transmitted in slot #0 905. The DCI transmitted in slot #0 905 may include scheduling information on a downlink data channel 902 and an RMI 903. The RMI 903 may indicate whether rate matching for the configured RMR 901 should be performed. An aggregation factor for the downlink data channel 902 is set to 4, and thus the downlink data channel 902 is scheduled and transmitted in a total of 4 slots, that is, slot #0 905, a slot #1 906, a slot #2 907 and a slot #3 908.

According to an embodiment, the RMI 903 transmitted in slot #0 905 may be identically applied 904 to all the slots in which the downlink data channel 902 has been scheduled, that is, slot #0 905 may be identically applied to slot #0 905, slot #1 906, slot #2 907 and slot #3 908. Further, if the RMI 903 obtained in slot #0 905 indicates that rate matching for the RMR 901 should be performed, rate matching for all the RMRs 901 present in slot #0 905, slot #1 906, slot #2 907 and slot #3 908 may be performed. If the RMI 903 obtained in slot #0 905 indicates that rate matching for the RMR 901 should not be performed, rate matching for all the RMRs 901 present in slot #0 905, slot #1 906, slot #2 907 and slot #3 908 may not be performed.

Second Embodiment

According to an embodiment, if a BS is configured for multi-slot scheduling for a data channel in a UE, an RMI received through DCI may be applied to only the first slot in which the data channel has been scheduled using a method of determining whether rate matching should be performed on a data channel scheduled with a multi-slot, and whether rate matching should be performed may be applied based on periodicity information semi-statically configured in a corresponding RMR with respect to the slots other than the first slot.

For example, a case where an aggregation factor is set as K, DCI is detected in an n-th slot, and a data channel scheduled based on the DCI is transmitted in m, m+1, . . . , m+K (m≥n) slots is considered.

If an RMI within the DCI indicates that rate matching for an RMR should not be performed, rate matching for the RMR may not be performed with respect to the first slot in which a data channel has been scheduled, that is, the m slot. Alternatively, if the RMI within the DCI indicates that rate matching for an RMR should be performed, rate matching for the RMR may be performed with respect to the first slot in which a data channel has been scheduled, that is, the slot m. Whether rate matching should be performed with respect to the remaining slots, that is, the m+1, . . . , m+K slots, may be determined based on periodicity information semi-statically configured in a corresponding RMR. For example, if the periodicity of an RMR has been configured for every slot, rate matching may be performed with respect to the remaining slots, that is, the m+1, . . . , m+K slots.

A BS may transmit an RMI for the RMR of the first slot in which a data channel is scheduled depending on the method. The BS may determine rate matching for a data channel by taking into consideration whether the periodicity of an RMR is present with respect to the remaining slots in which a data channel is scheduled, and may transmit a result of the determination.

A UE may receive an RMI from a BS, and may apply information of the received RMI to the first slot in which a data channel has been scheduled. Furthermore, the UE may determine rate matching for a data channel by taking into consideration the periodicity of an RMR with respect to the remaining slots in which a data channel has been scheduled.

In performing the method, the RMI may be applied from the first slot to an N-th slot in which a data channel has been scheduled. In this case, the value N may be pre-defined as a value greater than or equal to 1 or a BS may set the value N through higher layer signaling (e.g., MIB, SIB, RRC signaling) with respect to a UE.

Figure 10:
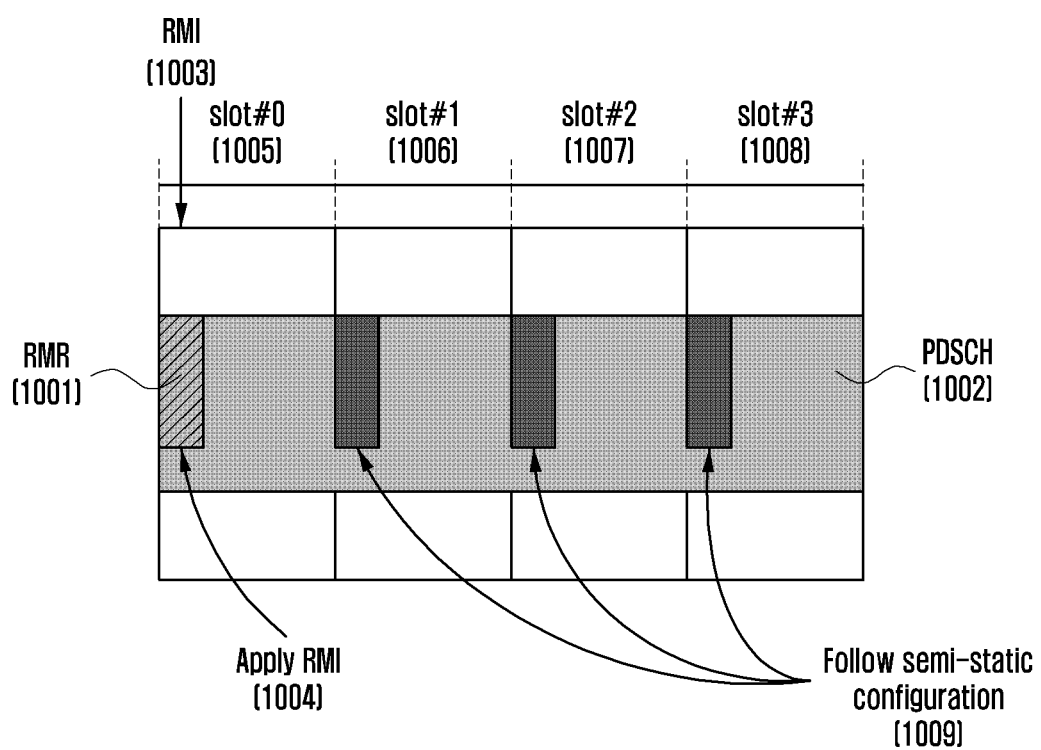
FIG. 10 is a diagram showing a configuration of an RMR according to an embodiment of the disclosure.

FIG. 10 is a diagram showing a configuration of an RMR, according to an embodiment.

Referring to FIG. 10, an RMR 1001 is configured and periodicity is 1 slot. That is, the RMR 1001 is present at the same time and frequency location in each slot. Furthermore, it is assumed that DCI is transmitted in slot #0 1005. The DCI transmitted in slot #0 1005 may include scheduling information on a downlink data channel 1002 and an RMI 1003. The RMI 1003 may indicate whether rate matching for the configured RMR 1001 should be performed. An aggregation factor for the downlink data channel 1002 is set to 4, and thus the downlink data channel 1002 is scheduled and transmitted in a total of 4 slots, that is, slot #0 1005, slot #1 1006, slot #2 1007, and slot #3 1008.

The RMI 1003 transmitted in slot #0 1005 may indicate whether rate matching is scheduled for the first slot, i.e., slot #0 1005, in which the downlink data channel 1002 should be performed (apply RMI 1004). If the RMI 1003 obtained in slot #0 1005 indicates that rate matching for the RMR 1001 should not be performed, rate matching may not be performed on the data channel 1002 transmitted in slot #0 1005. Whether rate matching should be performed in the remaining slots, i.e., slot #1 1006, slot #2 1007 and slot #3 1008 transmitted in the data channel 1002 may be determined based on periodicity information semi-statically configured in the RMR 1001 (follow semi-static configuration 1009). In FIG. 10, rate matching may be performed on the data channel 1002 in a corresponding region because the RMR 1001 is present in each of slot #1 1006, slot #2 1007 and slot #3 1008.

Third Embodiment

If a BS has configured multi-slot scheduling for a data channel in a UE, a different rate matching method may be applied based on a set value of the aggregation factor according to a method of determining whether rate matching should be performed on a data channel scheduled with a multi-slot.

The above-described embodiment is referred to as a "first rate matching method", and the above-described second embodiment is referred to as a "second rate matching method."

In the first rate matching method, only the same rate matching operation can be indicated with respect to all RMRs in which a data channel has been scheduled. Accordingly, as the length of a slot in which a data channel has been scheduled becomes longer (i.e., as the size of an aggregation factor increases), the probability that an RMR will be dynamically reused (i.e., the probability that a data channel will be transmitted in a resource region configured as an RMR) may be very small. Accordingly, in accordance with the first rate matching method, transmitting a dynamic RMI may be inefficient as the length of a slot in which a data channel has been scheduled increases.

The second rate matching method may always have the same effect regardless of the length of a slot in which a data channel has been scheduled because dynamic rate matching for the first slot among slots in which a data channel has been scheduled may be determined.

Whether the first rate matching method or the second rate matching method is applied based on scheduling aggregation factor configuration information for a data channel may be determined by considering configuration characteristics of the first rate matching method versus the second rate matching method.

Figure 11:
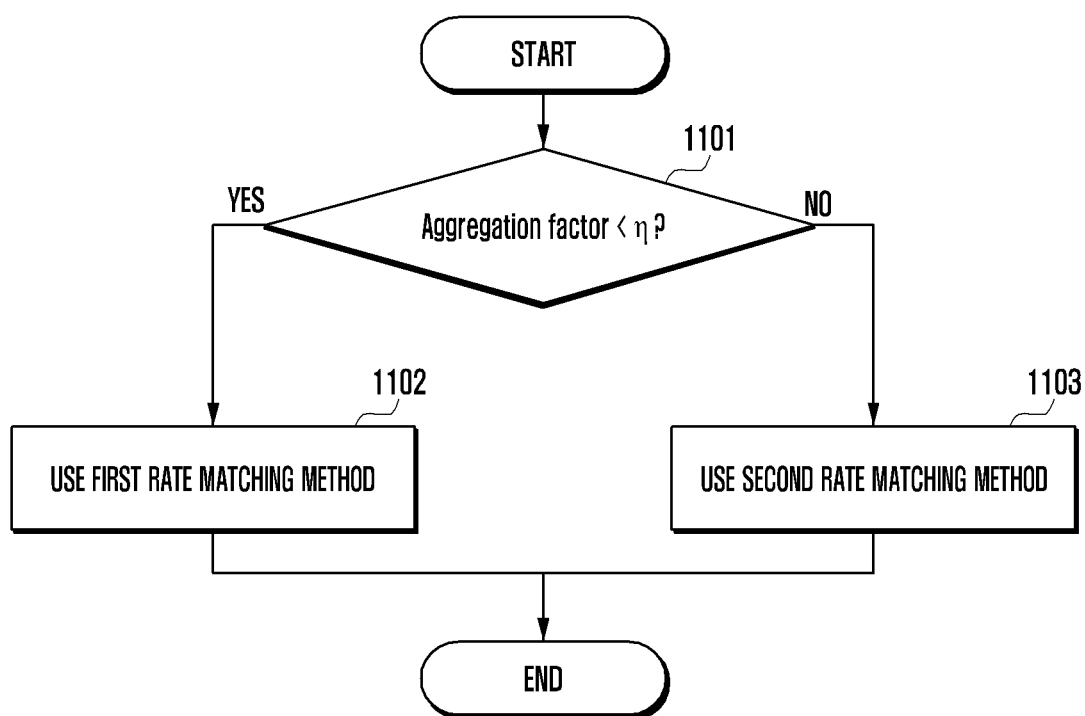
FIG. 11 is a diagram showing a flowchart for selecting a rate matching method according to an embodiment of the disclosure.

FIG. 11 is a diagram showing a flowchart for selecting a rate matching method.

According to an embodiment, at step 1101, whether an aggregation factor for configured multi-slot scheduling is less than a pre-defined threshold η is determined. If, as a result of the determination, a set aggregation factor is less than the threshold η, at step 1102, the "first rate matching method" is applied. If, as a result of the determination, the set aggregation factor is greater than or equal to the threshold η, at step 1103, the "second rate matching method" is applied.

A BS may configure a UE so that the UE uses the "first rate matching method" or the "second rate matching method" using higher layer signaling (e.g., at least one of MIB, SIB, RRC signaling).

Fourth Embodiment

If a BS has configured multi-slot scheduling for a data channel in a UE, the number of bits of an RMI may be determined by taking into consideration the number of slots (i.e., an aggregation factor) in which the data channel is scheduled according to a method of determining whether rate matching for the data channel scheduled with a multi-slot should be performed.

When multi-slot scheduling for data channel scheduling is not configured then it is assumed that an RMI is N bits.

In this case, if multi-slot scheduling for the data channel has been configured and a corresponding aggregation factor is K, the RMI of N bits per slot in which the data channel is scheduled may be transmitted, and thus the RMI may become a total of K·N bits.

If multi-slot scheduling for the data channel has been configured and a corresponding aggregation factor is K, K bits of an RMI of N (≥K) bits may indicate whether rate matching for one RMR in each slot should be performed.

Fifth Embodiment

If a BS has configured multi-slot scheduling for a data channel in a UE, whether dynamic rate matching should be performed using an RMI may not be indicated according to a method of determining whether rate matching should be performed for the data channel scheduled with a multi-slot. That is, if the BS has configured multi-slot scheduling for the data channel, an RMI field may be automatically disabled.

Figure 12:
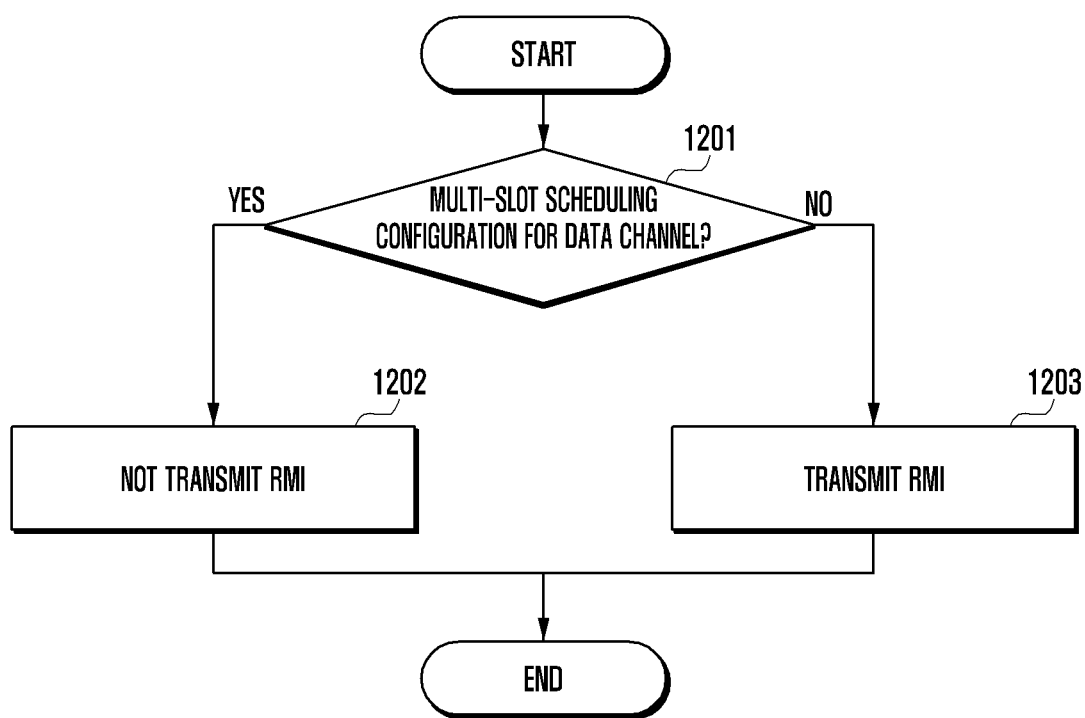
FIG. 12 is a diagram showing a flowchart for determining whether to transmit a rate matching indicator (RMI) according to an embodiment of the disclosure.

FIG. 12 is a diagram showing a flowchart for determining whether to transmit an RMI.

At step 1201, a BS determines whether multi-slot scheduling for a data channel should be performed according to whether multi-slot scheduling has been configured. If, as a result of the determination, multi-slot scheduling has not been configured, at step 1203, the BS may configure an RMI field within DCI with respect to a UE, and transmit an RMI. If, as a result of the determination, multi-slot scheduling has been configured, at step 1202, the BS and the UE may disable an RMI field within DCI, and thus an RMI is not transmitted.

The data channel taken into consideration in the first to fifth embodiments may correspond to a downlink data channel and an uplink data channel.

Sixth Embodiment

The sixth embodiment of the disclosure provides a DMRS configuration method for a PDCCH.

A BS may configure one or multiple CORESETs (e.g., a maximum of three CORESETs may be configured) with respect to a UE. Furthermore, the BS may configure an ID for generating a DMRS for each CORESET configured in the UE. In this case, if different CORESETs configured as different DMRS IDs are configured to overlap at the same time and frequency resource, the UE may perform redundant channel estimation on the same time/frequency resource. Accordingly, such redundant channel estimation may be inefficient because it may increase the buffer size of the UE. In order to solve this problem, the following methods may be taken into consideration.

According to a first method, a BS may always configure the same DMRS ID for overlapping CORESETs with respect to a UE. The UE does not expect different DMRS ID configurations for the overlapping CORESETs. If the UE performs channel estimation in an overlapping CORESET, it may perform a piece of channel estimation in an overlapping time and frequency resource and reuse the estimated channel information for blind decoding for the overlapping CORESETs.

According to a second method, a BS may always configure the same DMRS ID for all CORESETs with respect to a UE. That is, a DMRS ID for a PDCCH may be UE-specific. The UE may expect only one value as the DMRS ID for the PDCCH.

According to a third method, a BS may configure different DMRS IDs for respective CORESETs. If the BS has configured different DMRS IDs in overlapping CORESETs and a UE's monitoring of the overlapping CORESETs occurs at the same time, the BS may generate and transmit a DMRS by identically applying the DMRS ID of a CORESET having the lowest (or highest) CORESET index to all the CORESETs. If different DMRS IDs have been configured in the overlapping CORESETs and the UE performs monitoring on the overlapping CORESETs at the same time, the UE may perform channel estimation, assuming that a DMRS is transmitted by identically applying the DMRS ID of a CORESET having the smallest (or highest) CORESET index to all the overlapping CORESETs.

Seventh Embodiment

The seventh embodiment of the disclosure provides a method of determining the number of PDCCH candidate groups configuring a search space for a PDCCH.

A maximum blind decoding number may be defined by taking into consideration blind decoding complexity for a PDCCH of a UE. The blind decoding number may be defined as a total number of PDCCH candidate groups configuring a search space for all aggregation levels. When a PDCCH monitoring period is comprised of 14 symbols (1 slot) or more and the monitoring period is less than 14 symbols, a maximum blind decoding number (i.e., a total number of PDCCH candidates) per slot may follow Table 4.

TABLE 4

| Maximum blind decoding | Subcarrier spacing | | | |
|---|---|---|---|---|
| number per slot | 15 kHz | 30 kHz | 60 kHz | 120 kHz |
| Monitoring period ≥ 14 symbols | 44 | 36 | 22 | 20 |
| Monitoring period ≤ 14 symbols | 44 + X | 36 + Y | 22 + Y | 20 |

In Table 4, X and Y may correspond to a positive integer satisfying X≤16, Y≤8.

When the PDCCH monitoring period is less than 14 symbols, a UE may perform several pieces of PDCCH monitoring within one slot. In this case, a maximum blind decoding number in each piece of PDCCH monitoring within one slot must additionally be defined. For example, if the PDCCH monitoring period is P symbols, a maximum blind decoding number in each piece of PDCCH monitoring needs to be defined because a total number of pieces of Flooring(14/P) (Flooring(x) is a function outputting the greatest integer smaller than x) PDCCH monitoring may be present within the one slot. In a 5G system, it may be very inefficient to define a maximum blind decoding number for all configuration values because the PDCCH monitoring period can be configured in a symbol unit very flexibly. Accordingly, a method of determining a maximum blind number for each piece of PDCCH monitoring is provided hereinafter.

A maximum blind decoding number per slot is defined as X, a PDCCH monitoring period is defined as P (symbol), and a PDCCH monitoring number per slot is defined as N=Flooring(14/P), for convenience of description. In this case, a maximum blind decoding number in n-th PDCCH monitoring within one slot is defined as X(n).

According to a first method, a maximum blind decoding number in each piece of PDCCH monitoring within one slot may be identically defined. That is, the maximum blind decoding number may be defined to satisfy X(1)= X(2)= ... =X(N). In this case, the total number of blind decodings within one slot may be defined to not exceed X. For example, X(n) may be defined according to the following Equation (1).

$$X(n)=\text{Flooring}(X/N) \text{ for } 1 \leq n \leq N \tag{1}$$

According to a second method, a maximum blind decoding number in each piece of PDCCH monitoring within one slot may be identically defined. That is, the maximum blind decoding number may be defined to satisfy X(1)= X(2)= ... =X(N). In this case, the total number of blind decodings within one slot may exceed X. For example, X(n) may be defined according to the following Equation (2).

$$X(n)=\text{Ceiling}(X/N) \text{ for } 1 \leq n \leq N, \text{(Ceiling}(x) \text{ is a function outputting the greatest integer smaller than } x) \tag{2}$$

Figure 13:
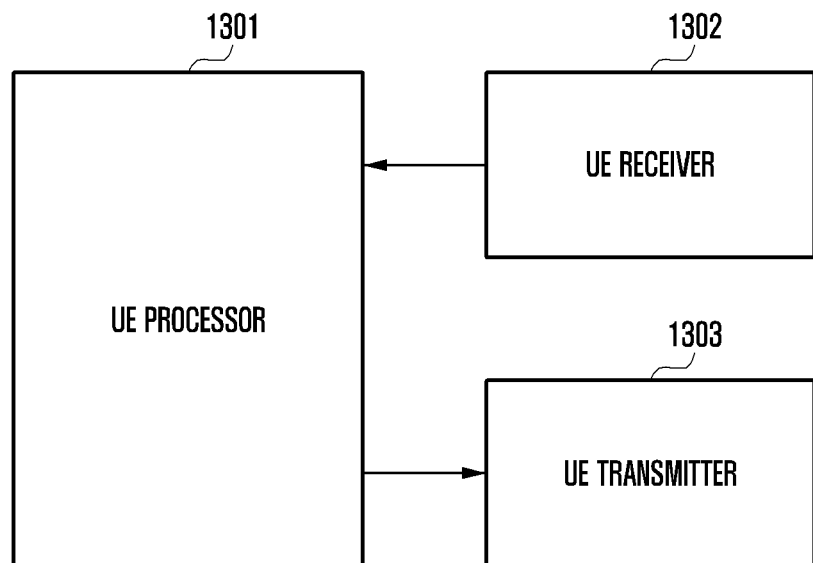
FIG. 13 is a block diagram showing the internal structure of a UE according to an embodiment of the disclosure.
Figure 14:
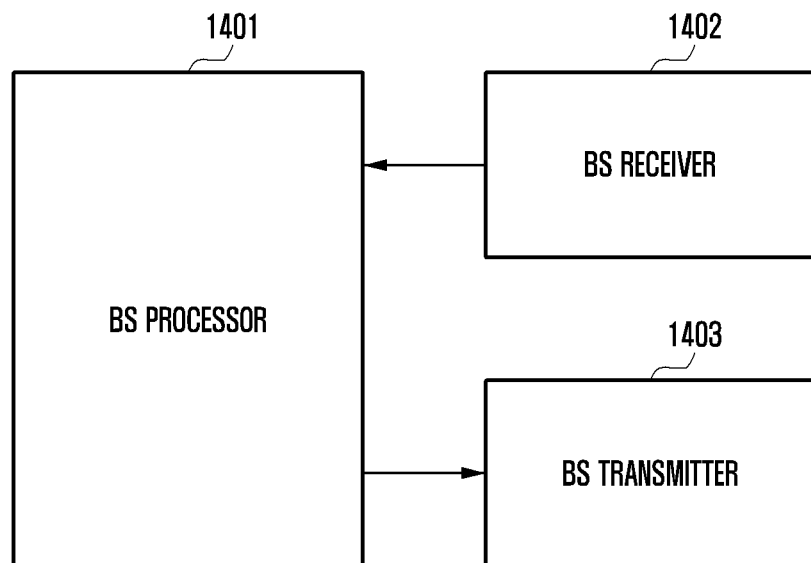
FIG. 14 is a block diagram showing the internal structure of a base station according to an embodiment of the disclosure.

The transmitters, receivers and controllers of a UE and a BS for executing the embodiments of the disclosure are shown in FIGS. 13 and 14. Specifically, FIG. 13 is a block diagram showing the internal structure of a UE, according to an embodiment. As shown in FIG. 13, the UE includes a UE processor 1301, a UE receiver 1302 and a UE transmitter 1303.

The UE processor 1301 may control a series of processes on which the UE may operate. For example, the UE processor may independently control a rate matching operation for a data channel and monitoring for a control channel.

The UE receiver 1302 and the UE transmitter 1303 may be commonly called a transceiver unit. The transceiver unit may transmit and receive signals to and from a BS. The signals may include control information and data. To this end, the transceiver unit may include a radio frequency (RF) transmitter configured to up-convert and amplify the frequency of a transmitted signal and an RF receiver configured to low-noise-amplify a received signal and to down-convert the frequency of the signal. Furthermore, the transceiver unit may receive a signal through a radio channel, may output the signal to the UE processor 1301, and may transmit a signal output by the UE processor 1301 through a radio channel.

FIG. 14 is a block diagram showing the internal structure of a BS, according to an embodiment. As shown in FIG. 14, the BS includes a BS processor 1401, a BS receiver 1402 and a BS transmitter 1403.

The BS processor 1401 may control a series of processes on which the BS may operate according to the embodiments of the disclosure. For example, the BS processor may independently control a rate matching operation for a data channel and monitoring for a control channel.

The BS receiver 1402 and the BS transmitter 1403 may be commonly called a transceiver unit. The transceiver unit may transmit and receive signals to and from a UE. The signals may include control information and data. To this end, the transceiver unit may include an RF transmitter configured to up-convert and amplify the frequency of a transmitted signal and an RF receiver configured to low-noise-amplify a received signal and to down-convert the frequency of the signal. Furthermore, the transceiver unit may receive a signal through a radio channel, may output the signal to the BS processor 1401, and may transmit a signal output by the BS processor 1401 through a radio channel.

Thus, channel estimation complexity of a UE can be reduced, buffer management can be facilitated, and radio resources can be used more efficiently based on the method of transmitting and receiving a downlink control channel and a data channel, according to embodiments of the present disclosure.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method performed by a terminal in a wireless communication system, the method comprising:
receiving, from a base station, information on a rate matching configuration and an aggregation factor associated with a number of a plurality of slots;
receiving, from the base station, downlink control information including scheduling information for data and a rate matching indicator;
identifying resources based on the scheduling information, except for at least one rate matching resource associated with the rate matching indicator; and
receiving, from the base station, the data on the identified resource,
wherein the data is repeated in the plurality of slots associated with the aggregation factor, and
wherein the rate matching indicator is applied to a slot where a rate matching configuration associated with the rate matching indicator is present among the plurality of slots.

2. The method of claim 1, wherein the at least one rate matching resource associated with the rate matching indicator is configured by the rate matching configuration via higher layer signaling.

3. The method of claim 1, wherein the number of the plurality of slots is 1, 2, 4, or 8.

4. The method of claim 2, wherein in case that the number of the plurality of slots is greater than a period of a rate matching resource, a pattern of the rate matching resource is repeated in the plurality of slots.

5. The method of claim 2, wherein in case that the number of the plurality of slots is less than or equal to a period of a rate matching resource, a pattern of the rate matching resource exists once in the plurality of slots.

6. A method performed by a base station in a wireless communication system, the method comprising:
transmitting, to a terminal, information on a rate matching configuration and an aggregation factor associated with a number of a plurality of slots;
transmitting, to the terminal, downlink control information including scheduling information for data and a rate matching indicator; and
transmitting, to the terminal, the data, wherein resources for the data correspond to resources indicated by the scheduling information except for at least one rate matching resource associated with the rate matching indicator, wherein the data is repeated in the plurality of slots associated with the aggregation factor, and wherein the rate matching indicator is applied to a slot where a rate matching configuration associated with the rate matching indicator is present among the plurality of slots.

7. The method of claim 6, wherein the at least one rate matching resource associated with the rate matching indicator is configured by the rate matching configuration via higher layer signaling.

8. The method of claim 6, wherein the number of the plurality of slots is 1, 2, 4, or 8.

9. The method of claim 7, wherein in case that the number of the plurality of slots is greater than a period of a rate matching resource, a pattern of the rate matching resource is repeated in the plurality of slots.

10. The method of claim 7, wherein in case that the number of the plurality of slots is less than or equal to a period of a rate matching resource, a pattern of the rate matching resource exists once in the plurality of slots.

11. A terminal in a wireless communication system, the terminal comprising:

a transceiver; and a controller configured to:

receive, from a base station via the transceiver, information on a rate matching configuration and an aggregation factor associated with a number of a plurality of slots, receive, from the base station via the transceiver, downlink control information including scheduling information for data and a rate matching indicator, identify resources based on the scheduling information, except for at least one rate matching resource associated with the rate matching indicator, and receive, from the base station via the transceiver, the data on the identified resource, wherein the data is repeated in the plurality of slots associated with the aggregation factor, and wherein the rate matching indicator is applied to a slot where a rate matching configuration associated with the rate matching indicator is present among the plurality of slots.

12. The terminal of claim 11, wherein the at least one rate matching resource associated with the rate matching indicator is configured by the rate matching configuration via higher layer signaling.

13. The terminal of claim 11, wherein the number of the plurality of slots is 1, 2, 4, or 8.

14. The terminal of claim 12, wherein in case that the number of the plurality of slots is greater than a period of a rate matching resource, a pattern of the rate matching resource is repeated in the plurality of slots.

15. The terminal of claim 12, wherein in case that the number of the plurality of slots is less than or equal to a period of a rate matching resource, a pattern of the rate matching resource exists once in the plurality of slots.

16. A base station in a wireless communication system, the base station comprising:

a transceiver; and a controller configured to:

transmit, to a terminal via the transceiver, information on a rate matching configuration and an aggregation factor associated with a number of a plurality of slots;

transmit, to the terminal via the transceiver, downlink control information including scheduling information for data and a rate matching indicator; and transmit, to the terminal via the transceiver, the data, wherein resources for the data correspond to resources indicated by the scheduling information except for at least one rate matching resource associated with the rate matching indicator, wherein the data is repeated in the plurality of slots associated with the aggregation factor, and wherein the rate matching indicator is applied to a slot where a rate matching configuration associated with the rate matching indicator is present among the plurality of slots.

17. The base station of claim 16, wherein the at least one rate matching resource associated with the rate matching indicator is configured by the rate matching configuration via higher layer signaling.

18. The base station of claim 16, wherein the number of the plurality of slots is 1, 2, 4, or 8.

19. The base station of claim 17, wherein in case that the number of the plurality of slots is greater than a period of a rate matching resource, a pattern of the rate matching resource is repeated in the plurality of slots.

20. The base station of claim 17, wherein in case that the number of the plurality of slots is less than or equal to a period of a rate matching resource, a pattern of the rate matching resource exists once in the plurality of slots.

* * * * *